UNITED STATES PATENT OFFICE.

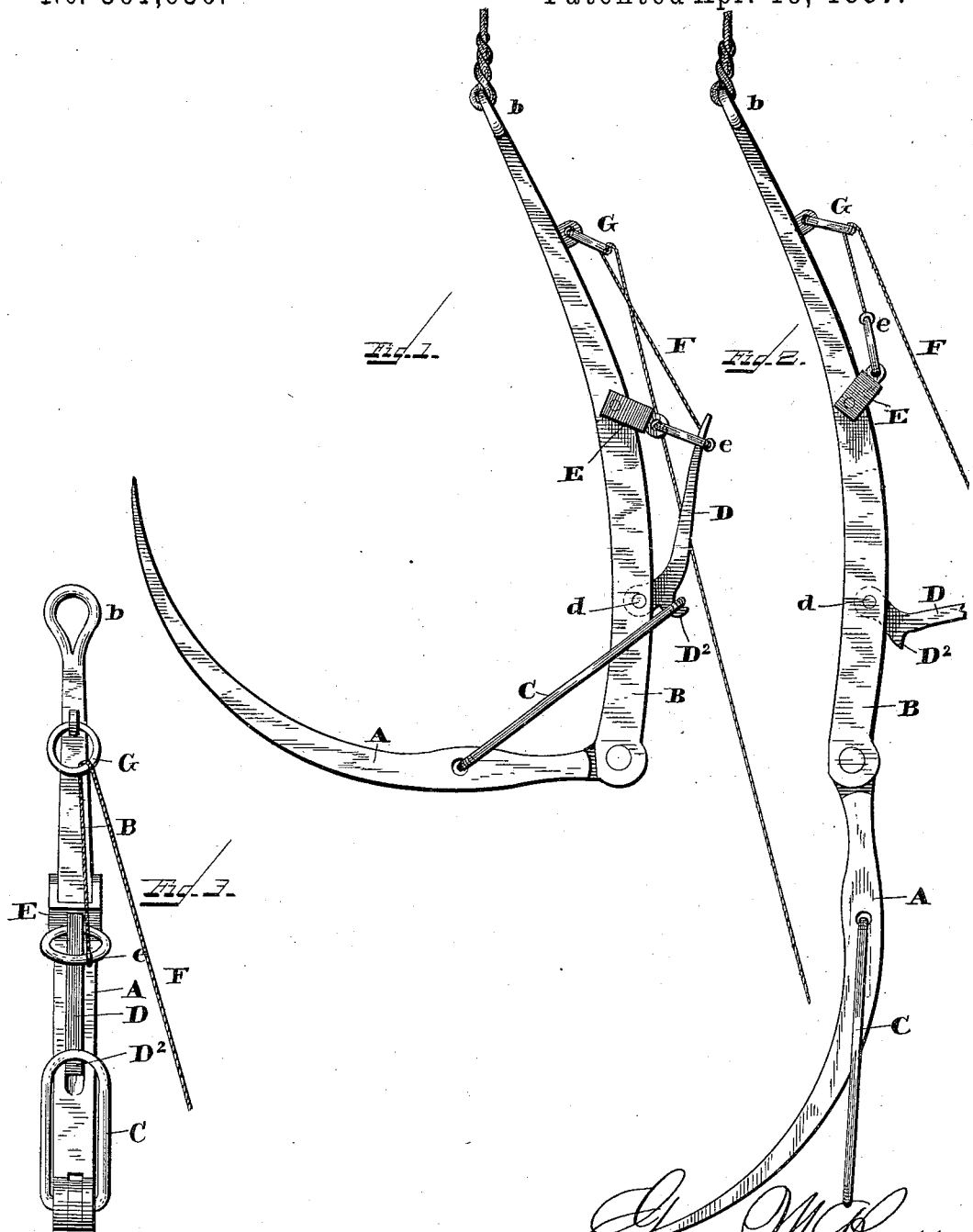

GEORGE M. ROSS, OF SLATE, WEST VIRGINIA.

HAY-FORK.

SPECIFICATION forming part of Letters Patent No. 361,650, dated April 19, 1887.

Application filed February 14, 1887. Serial No. 227,486. (No model.)

*To all whom it may concern:*

Be it known that I, GEORGE M. ROSS, a citizen of the United States, and a resident of Slate, in the county of Wood and State of West Virginia, have invented certain new and useful Improvements in Hay-Forks; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my invention when the parts are in position for elevating a load. Fig. 2 is a similar view of the parts when in position for dropping the load. Fig. 3 is a rear view when the parts are in the position shown in Fig. 1.

This invention relates to that class of hay-forks wherein is employed a tilting tine which is held in position to retain the load by means of a link or loop, and a tripping device so arranged that the operator may, when the load has been transported to the proper position, trip the tine-holding mechanism, thus allowing the tine to tilt and the load to fall; and it consists of certain improvements in the details of construction, as will be hereinafter pointed out.

Similar letters of reference indicate like parts in all the figures.

The tine (but one being shown and, by preference, used, though I do not limit myself to that number) is represented by A. It is pivotally supported in the lower end of the stock or standard B, which is at its upper end provided with an eye or ring, b, by which the device is supported by the hoisting-rope. The tine is free to move from the position shown in Fig. 1 to that shown in Fig. 2, it being in the latter position when the load is dropped and in the former while it is being hoisted and transported.

D is a trip bar or lever fulcrumed to the standard at d and adapted to have the longer arm, D', thereof extend upward and to lie along the rear face of the standard B. This bar or lever is provided with a short rearward-extending arm or projection, D², over which catches a link or loop, C, pivoted at one end to the tine a short distance in front of its connection with the standard.

E is a U-shaped gravitating catch pivoted to the standard and adapted to fall over the upper end of the arm D' of the trip-bar and to hold the same against the rear face of the standard.

It will be seen that when the link C is made to engage with the catch or projection D² of the trip-bar, and the gravitating catch is dropped down over the end of arm D', the tine will be securely held in the position shown in Fig. 1, and that it cannot tilt to drop a load which it may be supporting until the catch E is raised to free the end of the trip-bar, which will then be rocked on its pivot by means of the weight of the load and the tine, communicated thereto through the link, sufficiently far to release the link from projection D², and thus let the tine fall into the position shown in Fig. 2.

F is the rope by which the catch E is moved to release the arm D'. It is secured to the catch by an eye or ring, e, and passes thence up through a ring, G, carried by the standard, whence it passes downward to within convenient reach of the operator.

Having thus described my invention, what I claim, and desire to secure by Letters Patent, is—

1. In a hay-fork, the combination of the standard, the tine pivoted thereto, a trip bar or lever fulcrumed to the standard and having a projection, D², near its lower end, a link pivoted at one end to the tine and engaging with said projection, and means adapted to be tripped by the operator for preventing the trip-bar from rocking while the load is being hoisted, substantially as set forth.

2. In a hay-fork, the combination of the standard, the tine pivoted to the lower end thereof, a trip bar or lever, D, fulcrumed to the standard and having a projection, D², near its lower end, a link, C, pivoted to the tine, adapted to engage with said projection, a gravitating catch, E, and the rope which moves said catch, substantially as set forth.

In testimony that I claim the foregoing as my own I have hereunto affixed my signature in presence of two witnesses.

GEORGE M. ROSS.

Witnesses:
NATHANIEL BURNS,
T. J. NUTTER.